(12) United States Patent
Mochizuki

(10) Patent No.: US 8,233,012 B2
(45) Date of Patent: Jul. 31, 2012

(54) IMAGE PROCESSING APPARATUS, IMAGE PROCESSING METHOD, AND COMPUTER PROGRAM

(75) Inventor: Teruhiko Mochizuki, Tokyo (JP)

(73) Assignee: Sony Corporation (JP)

( * ) Notice: Subject to any disclaimer, the term of this patent is extended or adjusted under 35 U.S.C. 154(b) by 798 days.

(21) Appl. No.: 12/378,067

(22) Filed: Feb. 11, 2009

(65) Prior Publication Data

US 2009/0262140 A1 Oct. 22, 2009

(30) Foreign Application Priority Data

Feb. 12, 2008 (JP) ................................ P2008-030204

(51) Int. Cl.
*G09G 5/36* (2006.01)
(52) U.S. Cl. .......................... 345/660; 345/619; 345/419
(58) Field of Classification Search .................. 345/660, 345/619, 419
See application file for complete search history.

(56) References Cited

U.S. PATENT DOCUMENTS

| | | | | |
|---|---|---|---|---|
| 6,597,378 | B1* | 7/2003 | Shiraishi et al. | 715/764 |
| 8,069,466 | B2* | 11/2011 | Shelton et al. | 725/134 |
| 2004/0263486 | A1* | 12/2004 | Seni | 345/173 |
| 2005/0216862 | A1 | 9/2005 | Shinohara et al. | |
| 2008/0072172 | A1 | 3/2008 | Shinohara et al. | |
| 2008/0146277 | A1* | 6/2008 | Anglin et al. | 455/556.1 |
| 2009/0180551 | A1* | 7/2009 | Park et al. | 375/240.25 |
| 2010/0316127 | A1* | 12/2010 | Yokoyama | 375/240.16 |

FOREIGN PATENT DOCUMENTS

| | | |
|---|---|---|
| JP | 5-246077 A | 9/1993 |
| JP | 07-162750 A | 6/1995 |
| JP | 10-023248 A | 1/1998 |
| JP | 11-146234 A | 5/1999 |
| JP | 11-338454 A | 12/1999 |
| JP | 2005-099516 A | 4/2005 |
| JP | 2005-301992 A | 10/2005 |

* cited by examiner

*Primary Examiner* — Javid A Amini
(74) *Attorney, Agent, or Firm* — Lerner, David, Littenberg, Krumholz & Mentlik, LLP

(57) ABSTRACT

An image processing apparatus displaying an image on a display screen having a predetermined image size includes an image scaling unit scaling image information on a main image layer in a first memory area in accordance with the image size of the display screen; an on-screen display enlarging unit enlarging image information on an on-screen display layer read out from a second memory area so as to be fitted in the image size of the display screen; and a mixing unit mixing the enlarged image information on the on-screen display layer with the enlarged or reduced image information on the main image layer. The on-screen display enlarging unit includes first and second on-screen display partial enlargement units that enlarge the image information in an area without the display information on the on-screen display layer and in an area with the display information thereon, respectively.

8 Claims, 13 Drawing Sheets

FIG. 8

×2.0 CONVERSION

| OUTPUT PIXEL | 1 | 2 | 3 | 4 | ..... | 200 | 201 | 202 | 203 | 204 | 205 | 206 | 207 | 208 | 209 | 210 | 211 | 212 |
|---|---|---|---|---|---|---|---|---|---|---|---|---|---|---|---|---|---|---|
| CUMULATIVE VALUE (DECIMAL PART) | 4000 | 0000 | 4000 | 0000 | ..... | 0000 | 3627 | 6C4E | 2275 | 589C | 0EC3 | 44EA | 7B11 | 3138 | 675F | 1D86 | 53AD | 09D4 |
| CARRY | × | ○ | × | ○ | ..... | ○ | × | × | ○ | × | ○ | × | × | ○ | × | ○ | × | ○ |
| READ ADDRESS | 1 | 1 | 2 | 2 | ..... | 100 | 100 | 100 | 101 | 101 | 102 | 102 | 102 | 103 | 103 | 104 | 104 | 105 |

11-TO-26 PIXEL CONVERSION

| | 213 | 214 | 215 | 216 | 217 | 218 | 219 | 220 | 221 | 222 | 223 | 224 | 225 | 226 | 227 | ..... |
|---|---|---|---|---|---|---|---|---|---|---|---|---|---|---|---|---|
| | 3FFB | 7622 | 2C49 | 6270 | 1897 | 4EBE | 04E5 | 3B0C | 7133 | 275A | 5D81 | 13A8 | 49CF | 7FF6 | 361D | ..... |
| | × | × | ○ | × | ○ | × | ○ | × | × | ○ | × | ○ | × | × | ○ | ..... |
| | 105 | 105 | 106 | 106 | 107 | 107 | 108 | 108 | 108 | 109 | 109 | 110 | 110 | 110 | 111 | ..... |

○: WITH CARRY
×: WITHOUT CARRY

FIG. 10
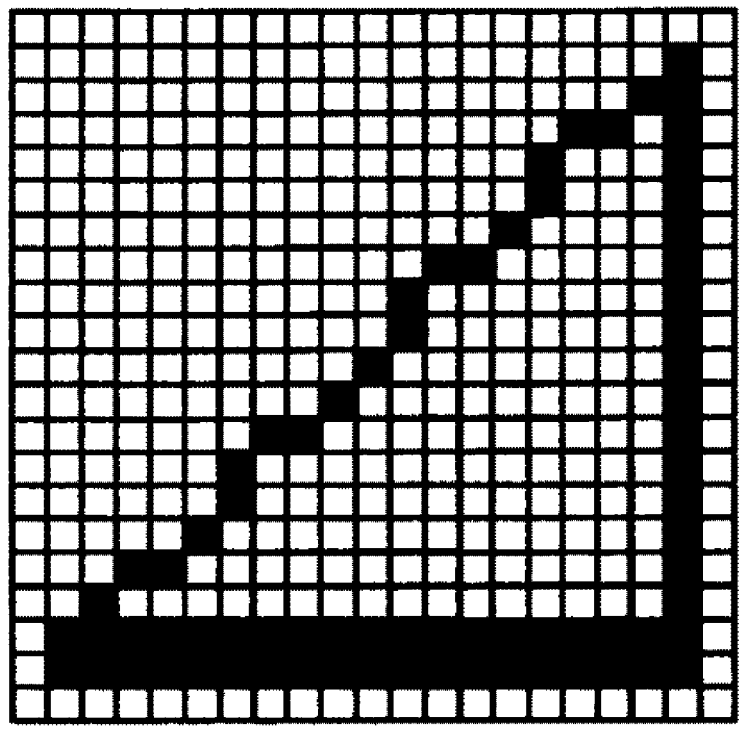
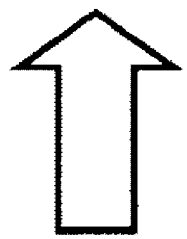
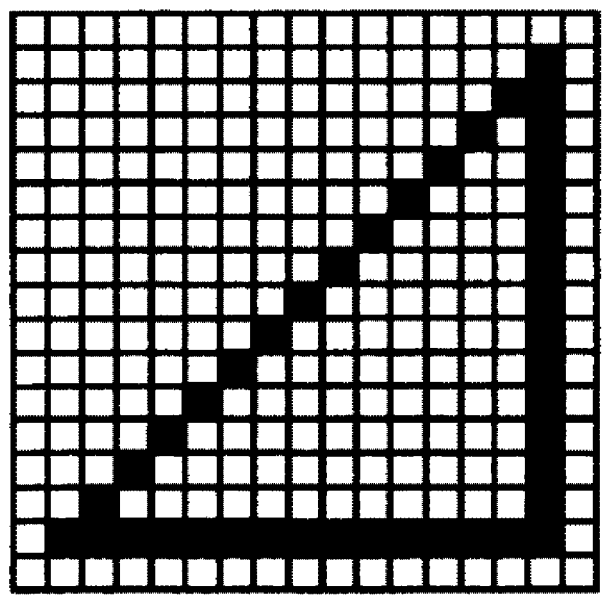

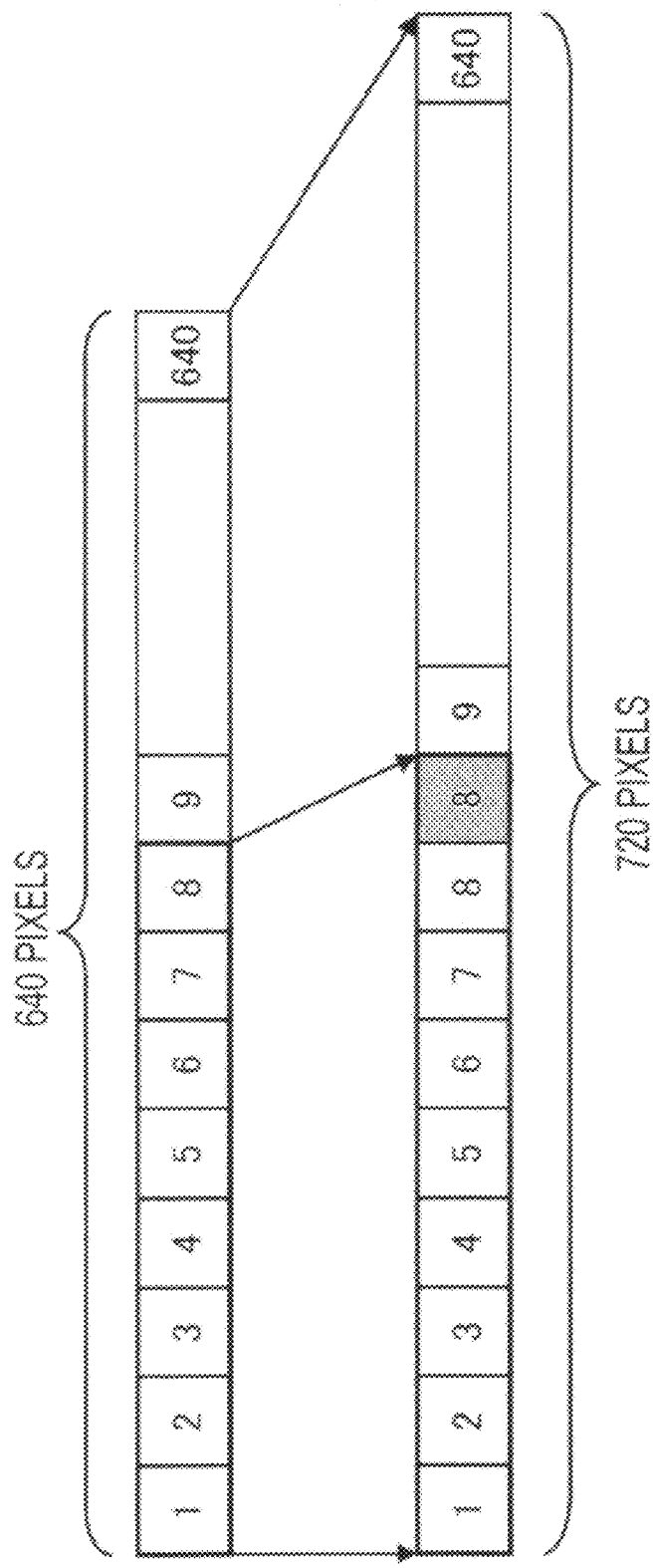

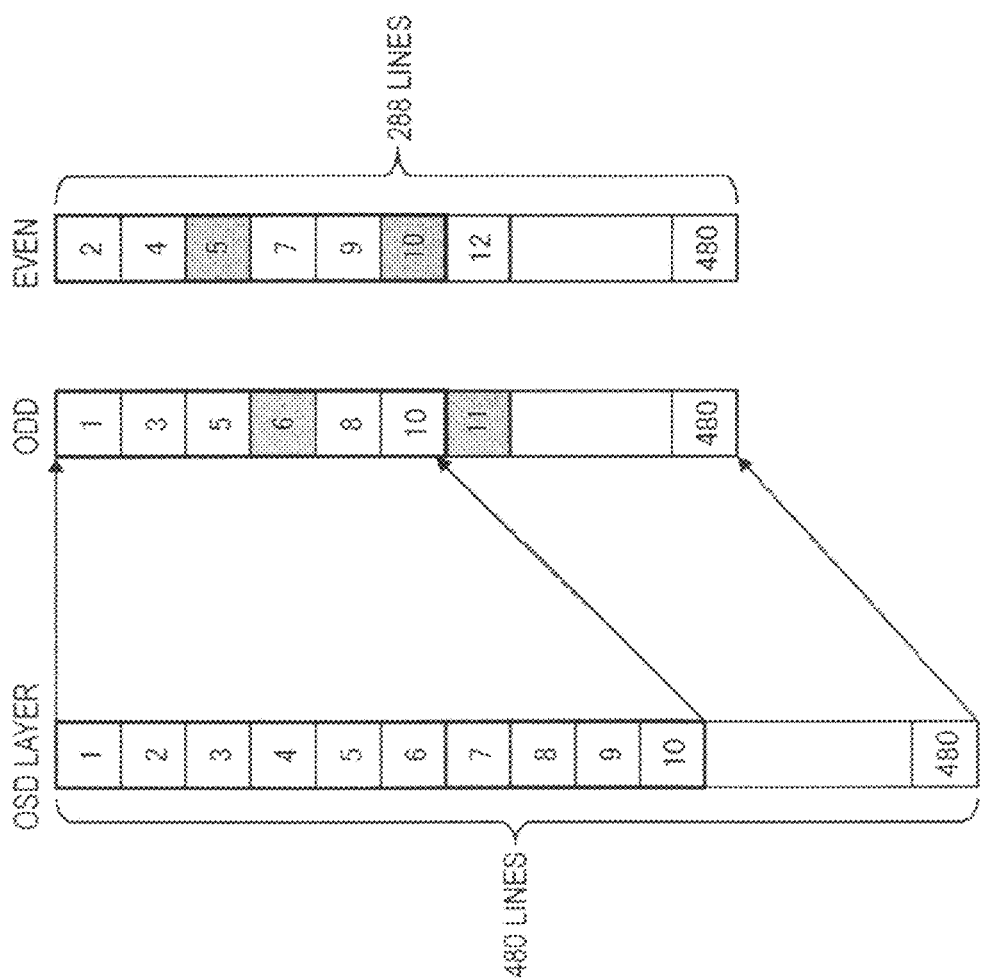

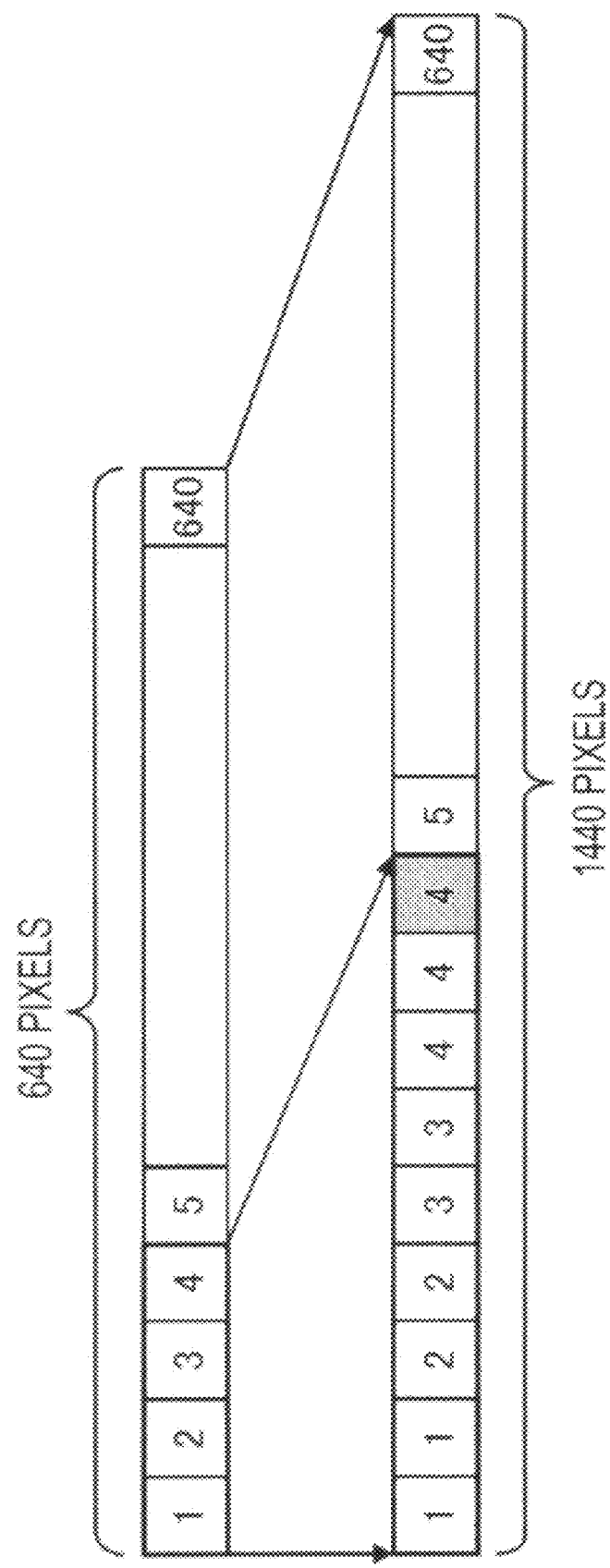

IMAGE PROCESSING APPARATUS, IMAGE PROCESSING METHOD, AND COMPUTER PROGRAM

CROSS REFERENCES TO RELATED APPLICATIONS

The present application claims priority from Japanese Patent Application No. JP 2008-030204, filed in the Japanese Patent Office on Feb. 12, 2008, the entire content of which is incorporated herein by reference.

BACKGROUND OF THE INVENTION

1. Field of the Invention

The present invention relates to an image processing apparatus, an image processing method, and a computer program that mix artificial images on On Screen Display (OSD) layers with main images on video layers and display the images resulting from the mixing. The main images are captured by image pickup devices, such as cameras, and are recorded or transmitted. The artificial images indicate information including the states of the apparatuses and the operating conditions. Particularly, the present invention relates to an image processing apparatus, an image processing method, and a computer program that are provided with memory areas only for the OSD, in addition to memory areas for video signals, and that mix the images on the OSD layers with the video signals for the OSD to display a variety of information on screens.

More specifically, the present invention relates to an image processing apparatus, an image processing method, and a computer program that perform the OSD in accordance with multiple image sizes corresponding to different resolutions of output images and different output formats of video signals. Particularly, the present invention relates to an image processing apparatus, an image processing method, and a computer program that have only one OSD layer having a reference size and that enlarge the image on the OSD layer in accordance with the image size of a video signal to be output to realize the OSD.

2. Description of the Related Art

Video cameras, digital cameras, etc. are in widespread use in recent years. Such video devices are generally provided with monitor displays displaying main images that are captured by image pickup devices, such as cameras, and are recorded or transmitted, and information indicating various settings is also displayed on the monitor displays. The main images are natural images composed of video signals captured by the cameras while the information about the various settings is artificial images, such as graphics, characters, or texts, generated by computers or the likes. The information about the various settings includes a recording or playback time, a recording-playback mode, and the remaining amount of battery. Such information is often superimposed on the main images in an "OSD" format.

The "OSD" is a very important function for displaying the states and/or the operating conditions of an apparatus and indicating to users how to operate the apparatus while main images are displayed. Most video devices currently manufactured and sold have the OSD function.

Digital cameras are commonly used as media for image information. For example, Japanese Unexamined Patent Application Publication No. 11-146234 discloses a digital camera that is capable of operating in a mode in which image data stored in a memory card is displayed or played back and in a mode in which a captured image is directly displayed. The digital camera mixes image data with character data indicating a counter, a date, image capturing conditions, etc. on the screen of a liquid crystal display (LCD) panel, which is a display apparatus, to realize the OSD.

For example, Japanese Unexamined Patent Application Publication No. 7-162750 discloses an on-screen control apparatus including a unit that scales a character or pattern into an arbitrary size, a unit that displays the character or pattern at an arbitrary position, and an operation unit on which a key used for scaling the character or pattern into an arbitrary size and a key used for moving the character or pattern to an arbitrary position are provided in order to display an on-screen image including the character or pattern on a monitor in a relatively east-to-see size and at a relatively easy-to-see position. The on-screen control apparatus displays the character or pattern in an arbitrary size and at an arbitrary position in response to operations with the keys.

Enlargement of the display sizes of icons involved in user settings allows the visibility of on-screen images to be improved. For example, Japanese Unexamined Patent Application Publication No. 2005-301992 discloses an electronic apparatus with a display, which determines a change in the state of the apparatus or in the operation condition that is set, identifies the icon indicating the changed state of the apparatus or the changed operation condition, and performs the OSD in a mode different from that of the previous icon.

Initial OSD only displays simple characters or graphics in one color and can be performed only by switching between a video signal and an OSD signal at vertical horizontal addresses specified on the display. However, information display during recording and playback becomes important along with an increasing range of functions of recent devices, and the OSD is necessary to achieve higher quality, higher function, and an increased number of colors. In addition, the design of the OSD is also emphasized for differentiation of products and it is necessary to display the OSD with higher quality as in natural images having higher resolution and multi-valued gradation.

Accordingly, methods are widely adopted at present, in which an OSD area is provided in part of a large scale memory where images are temporarily stored (or a memory area only for the OSD is provided, in addition to a memory area for video signals) and an OSD layer read out from the corresponding memory area is mixed with an image layer read out from the corresponding memory area at a constant ratio to realize the OSD with higher quality.

Many video devices including video cameras and digital cameras perform line output. Video signals in the line output have various formats, such as analog National Television System Committee (NTSC), analog Phase Alternating Line (PAL) (Standard Definition (SD)), and HiVision, and also have derived specifications for various image sizes, such as D1, D2, D3, and D4. Preparing the OSD for the respective formats and regenerating OSD layers each time the format is switched impose heavy loads on firmware and program read only memories (ROMs).

Some video cameras and digital cameras are capable of concurrently performing panel display and line output. The panel display normally has image sizes (resolutions) including Video Graphics Array (VGA) (horizontal 640 pixels× vertical 480 lines) and Super VGA (SVGA) (horizontal 800 pixels×vertical 600 lines), and OSD layers can be generated in accordance with the image sizes and can be mixed with main images to realize the OSD with higher quality. In contrast, since the line output has image sizes different from those of the panel display, such as the D1 (horizontal 720 pixels× vertical 480 lines) and the D3 (horizontal 1,920 pixels×vertical 1,080 lines), it is necessary to prepare the OSD layers for the line output separately from the OSD layers for the panel display. However, it is necessary to generate the OSD layers of the respective image sizes in the OSD area on a large scale random access memory (RAM) in order to concurrently output the OSD layers of the image sizes appropriate for the various output formats and, therefore, the OSD layers consume a significant capacity of the large scale RAM.

In general, in order to perform the OSD in accordance with the multiple specifications for the image sizes, only one OSD layer having a reference size is prepared and the OSD layer is appropriately enlarged and output in accordance with the image size when the mode of the image size of a video signal to be output is switched. The reference size of the OSD layer specifically means a minimum size that is normally involved and can be appropriately enlarged in accordance with the image size of an output destination.

Two methods are used to enlarge the OSD layer having the reference size: one method uses a filter to enlarge the OSD layer and the other method reads out a pixel or line twice on a predetermined cycle to enlarge the OSD layer.

In the former enlargement method, natural images can be enlarged or reduced by using an interpolation filter based on a sampling theorem, such as bilinear interpolation or Cubic interpolation. Accordingly, it is possible to generate enlarged images with higher quality in the case of the natural images having the multi-valued gradation and including noises in principle. However, since enlargement of artificial images by using the above interpolation filter rounds edges of, for example, characters, it is not possible to generate enlarged images with higher quality. Particularly, binary images, such as characters or texts, are often enlarged by nearest neighbor interpolation in order to avoid blurring caused by the rounded edges. However, the enlargement process by the nearest neighbor interpolation has a visual problem of jaggy (the jaggy observed at the outlines of images).

Accordingly, the latter method of reading out a pixel or line twice on a predetermined cycle to enlarge the OSD layer will now be considered.

For example, Japanese Unexamined Patent Application Publication No. 11-338454 discloses an on-screen display circuit having a decreased memory size to realize the OSD function. The on-screen display circuit realizes the decrease in the memory size by including a unit that repetitively reads out data on the same line of the bitmap in n lines in the OSD from a storage unit to vertically enlarge the OSD at a scaling factor "n" in vertical n-times enlargement and that reads out the lines of the bitmap for every n lines to vertically reduce the OSD at a scaling factor "1/n" in vertical 1/n-times reduction.

For example, Japanese Unexamined Patent Application Publication No. 2005-99516 discloses an image display apparatus that newly generates a horizontal synchronization signal for external synchronization by a synchronization signal generating circuit and supplies the generated horizontal synchronization signal to an external synchronization input of an external graphic generating apparatus, when a first graphic image supplied from the external graphic generating apparatus is converted into a second graphic image having effective lines of a number different from that of the first graphic image, to match the line display speed of the first graphic image output from the external graphic generating apparatus with the vertical size of the effective image area of a display apparatus (or a display unit) where the second graphic image is displayed.

When the image size on the OSD layer is enlarged at a scaling factor of an integer, for example, at a scaling factor of two or three, the same pixel is constantly read out twice or three times horizontally and vertically to generate a natural enlarged character or graphic. However, when the ratio between the image size of an original OSD layer and the image size of an output layer is not an integer, it is necessary to enlarge the horizontal and vertical image sizes of the OSD layer at a scaling factor of a real number. In the method of reading out an image twice to enlarge the image size at a scaling factor of a real number, the same pixel is read out twice only for every several pixels. In such a case, when a horizontal or vertical line written by one pixel arrives at the position where the double reading is performed, the horizontal or vertical line is doubled in thickness and loses the matching with other parts. In addition, when the same pixel is read out twice for every several pixels, enlargement of an oblique line results in a jaggy line, as shown in FIG. 10, and the design of characters or graphics can be damaged.

Output of an OSD layer generated for the panel display in an irrelevant image-size format, such as a line output format, will now be described.

For example, when the panel attached to the main body of a video device has the VGA size (horizontal 640 pixels× vertical 480 lines), the OSD layer is often generated in the same size (horizontal 640 pixels×vertical 480 lines). However, when the OSD layer is output in the analog NTSC line output format, it is necessary to perform the enlargement from 640 pixels to 720 pixels because the number of horizontal pixels in the NTSC is equal to 720 pixels. Since the enlargement from 640 pixels to 720 pixels is basically performed by repeating the enlargement process from eight pixels to nine pixels, the same pixel is repeated every eight pixels, as shown in FIG. 11.

When the analog PAL format is selected as the line output format of an OSD layer having the VGA size, it is necessary to output 288 lines in one field because the number of vertical lines in the PAL format is equal to 576 and the PAL format adopts an interlace method. Accordingly, as shown in FIG. 12, an original OSD layer is read out every other line and the next line is read out twice for every six lines to perform the enlargement of the OSD layer.

When the analog 3D format (horizontal 1,440 pixels×vertical 1,080 pixels) is selected as the line output format of an OSD layer having the VGA size, it is necessary to horizontally enlarge the 640 pixels to 1,440 pixels. Accordingly, as shown in FIG. 13, the same pixel is read out twice and the readout of the same pixel is repeated three times for every four pixels. In addition, since 540 lines should be output in one field because the interlace scan is normally performed, it is necessary to vertically enlarge 480 lines to 540 liens. In this case, the process of enlarging eight lines to nine lines is repeated and the same line is read out twice for every eight liens.

The image-size format of the panel or electronic view finder (EVF) display has no relation to the image size of the line output. Accordingly, in order to fit the OSD layer that is generated so as to be fitted in the image size of the panel or EVF display in the image size of the line output, it is necessary to perform the above process of performing the double reading of a pixel every several pixels. Such a conversion process of the image size is not in an irregular conversion mode that occurs at a lower frequency at which the damage to characters or graphics can be permitted but is in a normal mode that occurs at a considerably higher frequency. In other words, it is not possible to ignore such a conversion process.

SUMMARY OF THE INVENTION

It desirable to provide an excellent image processing apparatus, image processing method, and computer program that can preferably perform OSD in accordance with multiple image sizes corresponding to different resolutions of output images and different output formats of video signals.

It is also desirable to provide an excellent image processing apparatus, image processing method, and computer program that have only one OSD layer having a reference size and that can enlarge the image on the OSD layer in accordance with the image size of a video signal to be output to realize the natural and clear OSD.

It is also desirable to provide an excellent image processing apparatus, image processing method, and computer program that can perform enlargement while suppressing degradation of the image quality and damage to the design of characters or graphics when an OSD layer that is generated in advance is enlarged by several times in accordance with the image size of an output layer or when an OSD layer that is generated for panel display is output in an irrelevant image-size format, such as a line output format, in order to realize the natural and clear OSD.

According to an embodiment of the present invention, an image processing apparatus displaying an image on a display screen having a predetermined image size includes a first memory area storing image information on a main image layer; a second memory area storing image information on an on-screen display layer that includes display information including character information or graphic data and that has a predetermined reference size; image scaling means for scaling the image information on the main image layer in the first memory area in accordance with the image size of the display screen; on-screen display enlarging means for reading out the image information on the on-screen display layer from the second memory area and enlarging the readout image information so as to be fitted in the image size of the display screen; and mixing means for mixing the enlarged image information on the on-screen display layer with the enlarged or reduced image information on the main image layer. The on-screen display enlarging means includes first on-screen display partial enlargement means for enlarging the image information in an area where the display information is not present on the on-screen display layer and second on-screen display partial enlargement means for enlarging the image information in an area where the display information is present on the on-screen display layer by a method different from that of the first on-screen display partial enlargement means.

In video devices including video camera and digital cameras, the horizontal and/or vertical sizes of images are generally enlarged or reduced appropriately in accordance with the output sizes or the formats of the panel display, the EVF display, or the line output and the enlarged or reduced images are displayed in the display screens. In recent years, the display information indicating a recording time, the remaining amount of battery, or an image capturing mode is generated in a memory as the OSD layer, as in the image layer including the main image, to improve the image quality. The display information is appropriately enlarged in accordance with the image size to be output and the enlarged display information is mixed with the image.

As described above, when an OSD layer that is generated in advance is enlarged by several times in accordance with the image format of a video signal or when an OSD layer that is generated for the panel display is output in an irrelevant image format, such as a line output format, the double reading of a pixel for every several pixels and the conversion of the image size can degrade the image quality of the original OSD layer and can damage the design of characters or graphics.

Such a technical problem can be caused by display of the entire graphics composing the OSD layer in a discontinuous readout manner. Accordingly, the inventor, etc. focused attention on the display characteristics of the OSD in popular video devices including video cameras and digital cameras and claimed the present invention in order to resolve such a technical problem.

Normal OSD is used to display a variety of information, such as a recording time, a recording mode, and the remaining amount of battery. In the OSD displayed concurrently with a captured or playback image, the display information is generally arranged in the four corner areas on the screen so that the display information does not block the captured or playback image, which is a main image. The image processing apparatus according to the embodiment of the present invention uses such characteristics of the OSD to enlarge the OSD layer. Specifically, the image processing apparatus according to the embodiment of the present invention does not enlarge or enlarges at a scaling factor of an integer the area where character or graphic data is present and enlarges only the central area where no character or graphic data is normally present for image confirmation at a scaling factor of a real number. For example, in an example shown in FIG. 1, discontinuous readout of pixels, such as intermittent double reading in which the same pixel is read out twice for every several pixels is not performed in the four corner areas on a screen where the display information is present on the OSD layer whereas the intermittent double reading is performed in an area where the display information is not present to perform the enlargement at a scaling factor of a real number, in order to enlarge the entire OSD layer to the same image size as that of the main image to be output.

Accordingly, when the OSD layer is fitted in an image size that is not related to the OSD layer, the entire OSD layer is enlarged at a scaling factor of a real number while the enlargement at a scaling factor of an integer (including 1× magnification) is performed in the four corner areas where the presence of the character or graphic data is supposed. As a result, it is possible to avoid the degradation of the image quality of characters or graphics and to keep the design thereof.

In the image processing apparatus according to the embodiment of the present invention, the first on-screen display partial enlargement means preferably enlarges the area where the display information is not present on the on-screen display layer at a scaling factor of a real number, and the second on-screen display partial enlargement means preferably enlarges the area where the display information is present on the on-screen display layer at a scaling factor "N". "N" is an integer not smaller than one and the graphic data in the display information is enlarged only at a scaling factor of an integer (including 1× magnification).

The first on-screen display partial enlargement means may read out the same pixel twice on a predetermined cycle while normally reading out pixels one by one or the first on-screen display partial enlargement means may increase the number of times of readout of the same pixel on a predetermined cycle while normally continuously reading out the same pixel a predetermined number of times, in order to enlarge the area where the display information is not present on the on-screen display layer at a scaling factor of a real number.

The second on-screen display partial enlargement means may not perform the enlargement in the area where the display information is present on the on-screen display layer. Alternatively, the second on-screen display partial enlargement means may enlarge the area where the display information is present at a scaling factor of an integer if the scaling factor of the OSD layer is too high. Specifically, the second on-screen display partial enlargement means may continuously read out the same pixel a predetermined number of times in the area where the display information is present on the on-screen display layer to perform the enlargement at scaling factor of an integer. In this case, the display information including the character or graphic data is naturally enlarged.

Such an enlargement process can be specifically realized by composing the initial value, which is the address of the readout start position on the OSD layer in the second memory area, by an integer part and a decimal part and by accumulatively adding the addition value determined by the enlargement method to the initial value to control the count-up operation of the readout address in accordance with the addition result. In the former method in which the same pixel is read out twice on a predetermined cycle while normally reading out pixels one by one, the counter of the readout address is stopped if the carry of the integer part occurs. In the latter method in which the number of times of readout of the same pixel is increased on a predetermined cycle while normally continuously reading out the same pixel a predetermined number of times, the count-up operation of the readout address is performed if the carry of the integer part occurs. Accordingly, it is possible to easily switch the scaling factor for every area on the OSD layer by using the read circuit twice, that is, in the carry of the initial value and in the carry of the addition value to switch the addition value. In other words, the OSD partial enlargement by using the first on-screen display partial enlargement means and the second on-screen display partial enlargement means can be realized by adding simple and minimal circuits.

Although the OSD layer in which the display information is present in the four corner areas of the screen and no display information is present around the center of the screen is described above, the embodiments of the present invention are not restricted to a specific OSD configuration. Even if the OSD layer has a rather complicated configuration, the quality of the character or graphic data can be kept and similar effects can be achieved by varying the scaling factor of each blank line or column that is specified.

According to another embodiment of the present invention, an image processing method for mixing image information on a main image layer with image information on an on-screen display layer that includes display information including character information or graphic data and displaying the mixed image on a display screen having a predetermined image size includes the steps of scaling the image information on the main image layer in accordance with the image size of the display screen; enlarging the image information on the on-screen display layer having a predetermined reference size so as to be fitted in the image size of the display screen; and mixing the enlarged image information on the on-screen display layer with the enlarged or reduced image information on the main image layer. The enlarging includes a first on-screen display partial enlargement step for enlarging the image information in an area where the display information is not present on the on-screen display layer and a second on-screen display partial enlargement step for enlarging the image information in an area where the display information is present on the on-screen display layer by a method different from that of the first on-screen display partial enlargement step.

According to another embodiment of the present invention, a computer-readable program causes a computer to perform a process of displaying an image on a display screen having a predetermined image size. The program causes the computer to function as a first memory area storing image information on a main image layer; a second memory area storing image information on an on-screen display layer that includes display information including character information or graphic data and that has a predetermined reference size; image scaling means for scaling the image information on the main image layer in the first memory area in accordance with the image size of the display screen; on-screen display enlarging means for reading out the image information on the on-screen display layer from the second memory area and enlarging the readout image information so as to be fitted in the image size of the display screen; and mixing means for mixing the enlarged image information on the on-screen display layer with the enlarged or reduced image information on the main image layer. The on-screen display enlarging means includes first on-screen display partial enlargement means for enlarging the image information in an area where the display information is not present on the on-screen display layer and second on-screen display partial enlargement means for enlarging the image information in an area where the display information is present on the on-screen display layer by a method different from that of the first on-screen display partial enlargement means.

The computer-readable program according to the embodiment of the present invention defines the computer program described in a computer-readable format so that predetermined processes are realized on the computer. In other words, installing the computer-readable program according to the embodiment of the present invention on the computer produces a cooperative effect on the computer, thus achieving the same effects as those of the image processing apparatus according to the embodiment of the present invention.

According to the present invention, it is possible to provide an excellent image processing apparatus, image processing method, and computer program that can preferably perform OSD in accordance with multiple image sizes corresponding to different resolutions of output images and different output formats of video signals.

According to the present invention, it is also possible to provide an excellent image processing apparatus, image processing method, and computer program that have only one OSD layer having a reference size and that can enlarge the image on the OSD layer by reading out pixels or lines a number of times corresponding to the image size of a video signal to be output to realize the natural and clear OSD.

According to the present invention, it is also possible to provide an excellent image processing apparatus, image processing method, and computer program that can perform the enlargement while suppressing degradation of the image quality and damage to the design of characters or graphics when an OSD layer that is generated in advance is enlarged by several times in accordance with the image size of an output layer or when an OSD layer that is generated for the panel display is output in an irrelevant image-size format, such as a line output format, in order to realize the natural and clear OSD.

In the image processing apparatus according to the embodiment of the present invention, when the operation in which the same pixel is read out twice for every several pixels is used to enlarge the OSD layer at a scaling factor of a real number, the double reading of the image is not performed in the area where character or graphic data is present on the OSD layer to realize the clear and natural OSD. Such partial enlargement of the OSD layer has the advantages of avoiding the degradation of the image quality of characters or graphics and keeping the design thereof not only in the enlargement process at a lower scaling factor, such as the conversion from 640 pixels to 720 pixels, but also in the enlargement process at a higher scaling factor, such as the conversion from 640 pixels to 1,440 pixels.

For example, in the video devices including video cameras and digital cameras, a variety of information including a recording or playback time, a recording-playback mode, and the remaining amount of battery is displayed on the OSD layer near the top, bottom, left, and right corners of the screen during image capturing and playback. Even if character or graphic data, such as a title or a warning message, is displayed on the OSD layer in the central area of the screen, the OSD partial enlargement is performed in the area, that is, the enlargement is not performed or the enlargement at a scaling factor of an integer is performed in the area, to achieve similar effects. Specifically, it is possible to avoid the degradation of the image quality of characters or graphics and to keep the design thereof by enlarging a line or column where no character or graphic data is present at a scaling factor of a real number on the OSD layer including character or graphic data at various positions on the screen to enlarge the entire OSD layer at a predetermined scaling factor.

The OSD enlargement process according to the embodiment of the present invention, in which the enlargement at a scaling factor of an integer is performed in the area where character or graphic data is present and the enlargement at a scaling factor of a real number is performed in the other areas, can be achieved by adding only a small number of circuit components to the hardware. Accordingly, the embodiment of the present invention can be realized by adding only a small number of gates.

Further features of the present invention will become apparent from the following description of exemplary embodiments with reference to the attached drawings.

BRIEF DESCRIPTION OF THE DRAWINGS

FIG. 8 illustrates the partial enlargement process to enlarge horizontal 640 pixels to the D terminal output in the D3 format (horizontal 1,440 pixels);

FIG. 10 illustrates enlargement of the horizontal and vertical image sizes of the OSD layer at a scaling factor of a real number and, specifically, illustrates a case where the same pixel is read out twice for every several pixels to enlarge an oblique line;

FIG. 11 illustrates an enlargement method when the OSD layer having the VGA size is subjected to line output in an analog NTSC format and, specifically, illustrates a case where the readout of the same pixel is repeated every eight pixels to perform horizontal enlargement from 640 pixels to 720 pixels;

FIG. 12 illustrates an enlargement method when, the OSD layer having the VGA size is output in an analog PAL format and, specifically, illustrates a case where an original OSD layer is read out every other line and the next line is read out twice for every six lines; and FIG. 13 illustrates an enlargement method when the OSD layer having the VGA size is subjected to line output in an analog 3D format and, specifically, illustrates a case where the same pixel is read out twice and the readout of the same pixel is repeated three times for every four pixels to perform horizontal enlargement from 640 pixels to 1,440 pixels.

DESCRIPTION OF THE PREFERRED EMBODIMENTS

Embodiments of the present invention will herein be described in detail with reference to the attached drawings.

Figure 2:
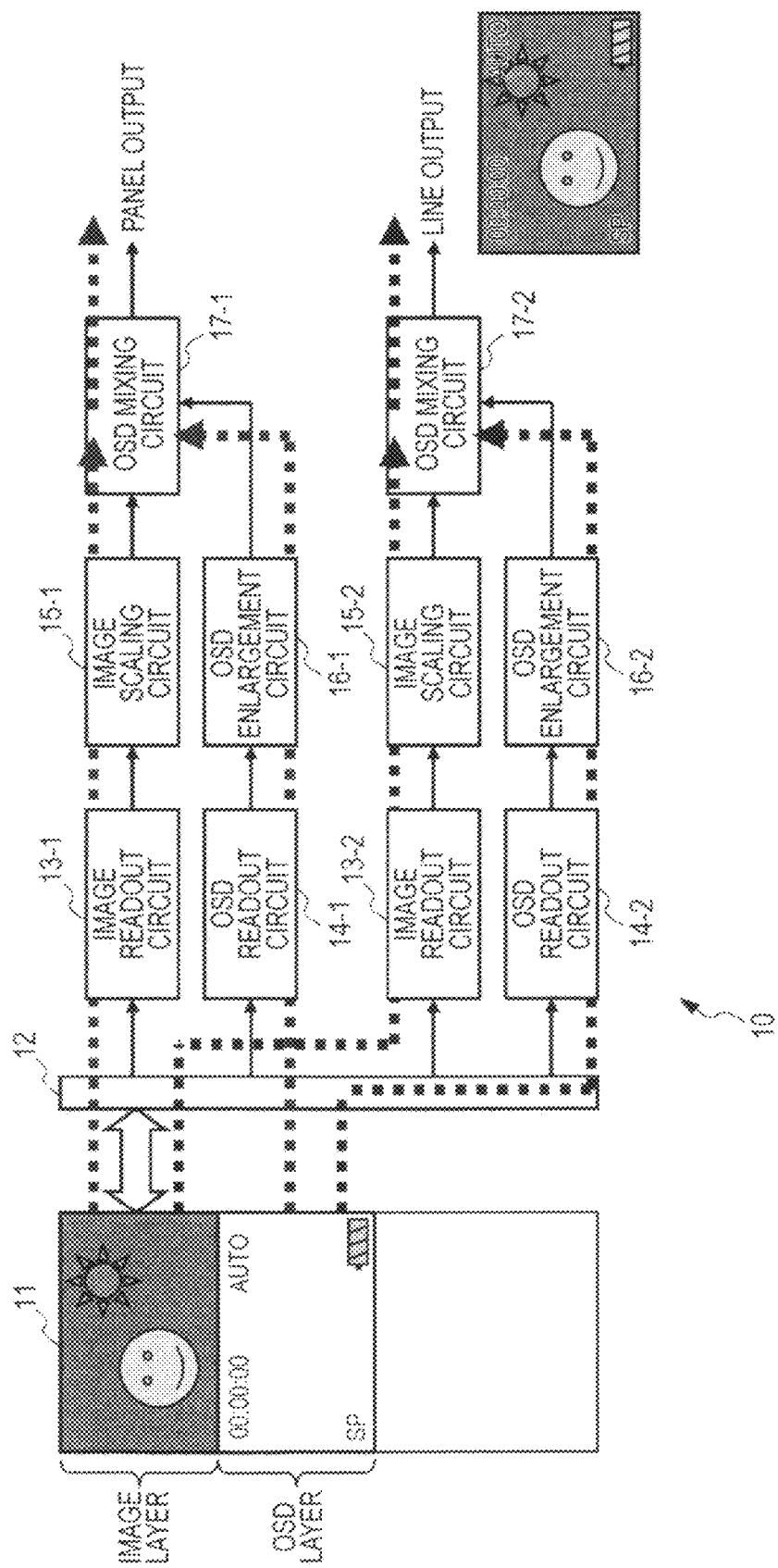
FIG. 2 schematically illustrates an example of the configuration of a still image display system according to an embodiment of the present invention.

FIG. 2 schematically illustrates an example of the configuration of a still image display system according to an embodiment of the present invention. The still image display system in FIG. 2 can be mounted in various video devices including a video camera and a digital camera.

Referring to FIG. 2, a still image display system 10 includes a large scale RAM 11, image readout circuits 13-1 and 13-2, OSD readout circuits 14-1 and 14-2, image scaling circuits 15-1 and 15-2, OSD enlargement circuits 16-1 and 16-2, and OSD mixing circuits 17-1 and 17-2. The still image display system 10 includes a display image processing block including the image readout circuit, the OSD readout circuit, the image scaling circuit, the OSD enlargement circuit, and the OSD mixing circuit for each image format, such as the panel display or the line output. The image readout circuits 13-1 and 13-2, the OSD readout circuits 14-1 and 14-2, the image scaling circuits 15-1 and 15-2, the OSD enlargement circuits 16-1 and 16-2, and the OSD mixing circuits 17-1 and 17-2 are collectively referred to as the image readout circuit 13, the OSD readout circuit 14, the image scaling circuit 15, the OSD enlargement circuit 16, and the OSD mixing circuit 17, respectively, in the following description. The large scale RAM 11 temporarily stores the image frame of an image layer (a main image) including a captured image or a playback image, the image frame of an OSD layer to be superimposed on the image layer, and so on. The image readout circuit 13 and the OSD readout circuit 14 access the RAM 11 via a data bus 12 to read out the image layer and the OSD layer, respectively. The image scaling circuit 15 enlarges or reduces the readout image layer in accordance with the image size in an output block (not shown), and the OSD enlargement circuit 16 enlarges the readout OSD layer in accordance with the image size in the output block (not shown). The OSD mixing circuit 17 mixes the OSD layer with the image layer resulting from the enlargement or reduction.

Figure 1:
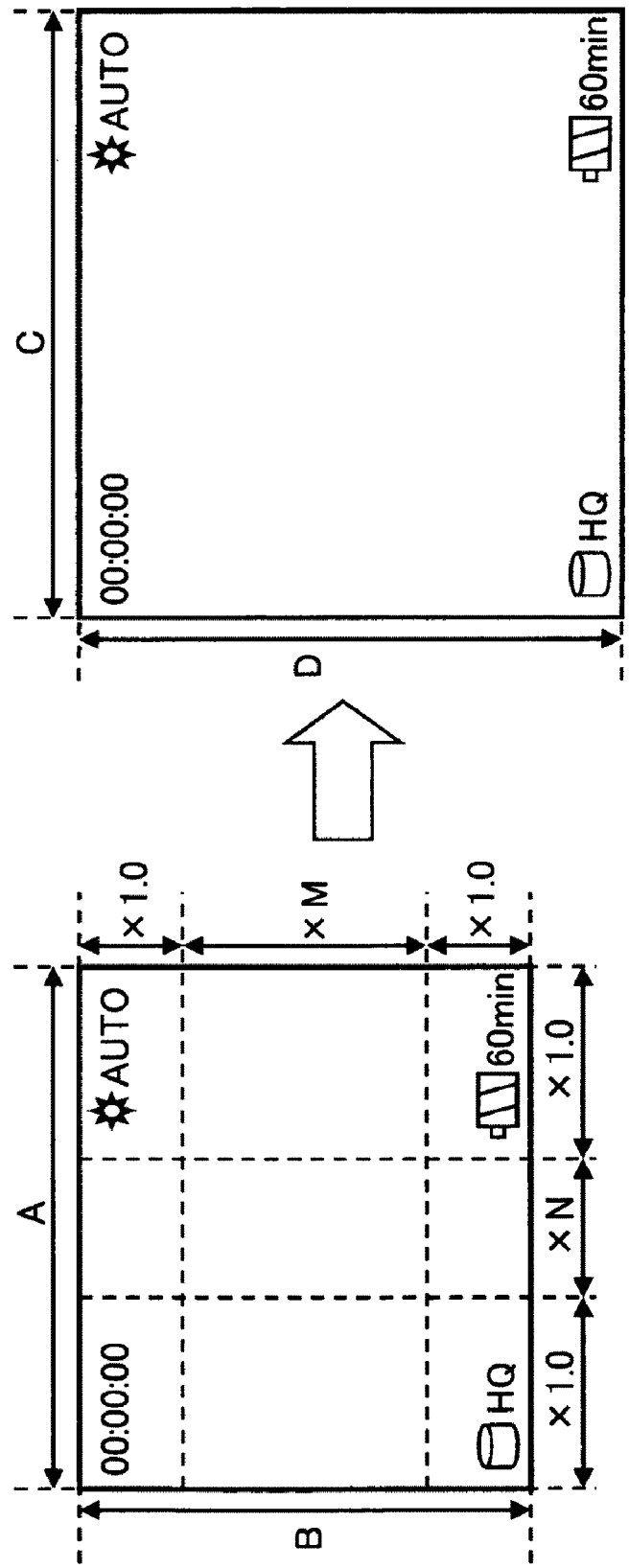
FIG. 1 illustrates a case where discontinuous readout of a pixel is not performed in the four corner areas on a screen where display information is present on an OSD layer and enlargement at a scaling factor of a real number is performed in areas where no display information is present.

The OSD enlargement circuit 16 performs enlargement at a scaling factor of an integer (including 1× magnification) in an area where character or graphic data is present on the OSD layer and performs enlargement at a scaling factor of a real number in an area where the character or graphic data is not present on the OSD layer to enlarge the entire OSD layer at a predetermined scaling factor (refer to FIG. 1). Such an enlargement process of the OSD layer will be described below.

In the application of the still image display system 10 to a video camera or a digital camera, after a captured image (or playback image) is temporarily stored in the RAM 11, the image is written in the still image display system 10 via the data bus 12, is converted into a size for the panel display or the line output, and is supplied to the output block. When a variety of information (for example, a recording or playback time, a recording-playback mode, and the remaining amount of the battery) generated by a central processing unit (CPU) (not shown) controlling the operation of the entire video device is used to generate an OSD layer of a reference size, the generated OSD layer is stored in an area different from that of the image layer on the large scale RAM 11, is written in the still image display system 10 via the data bus 12 as in the image layer, is subjected to the size conversion, is mixed with the image layer, and is supplied to the output block. The reference size of the OSD layer specifically means a minimum size that is normally involved.

The still image display system mounted in a digital camera is exemplified in the following description. However, even if the image stored in the large scale RAM 11 is a moving image varied for every field, the operation of the moving image is basically not different from that of the still image because the moving image indicates an operation of the digital camera in a moving-image capturing mode or in capturing of a digital video.

The mixing of the OSD layer with the image layer is an operation during recording if the image written in the large scale RAM 11 is an image captured by an image pickup device, and the mixing of the OSD layer with the image layer is an operation during playback if the image written in the large scale RAM 11 is an image read out from a recording device, such as a tape, a memory card, a disk, or a hard disk. The enlargement process of the OSD layer and the mixing process of the enlarged OSD layer, described below, are common between the recording operation mode and the playback operation mode.

The function of enlarging the OSD layer and displaying the enlarged OSD layer of the still image display system 10 according to the embodiment of the present invention can be installed in various video devices, such as a video receiver and a video cassette recorder, having the function of mixing the image layer with the OSD layer.

Various OSD-layer enlargement circuits have been proposed. Of the circuits, circuits adding an addition value that is a real number not larger than one to an initial value that is set and performing double reading of a pixel if the carry of an integer part occurs are popular. Although the circuit systems intermittently performing the double reading of a pixel are in widespread use in the art, a circuit according to an embodiment of the present invention is very effective because of its small size. Operations according to embodiments of the present invention will be described in detail.

Figure 3:
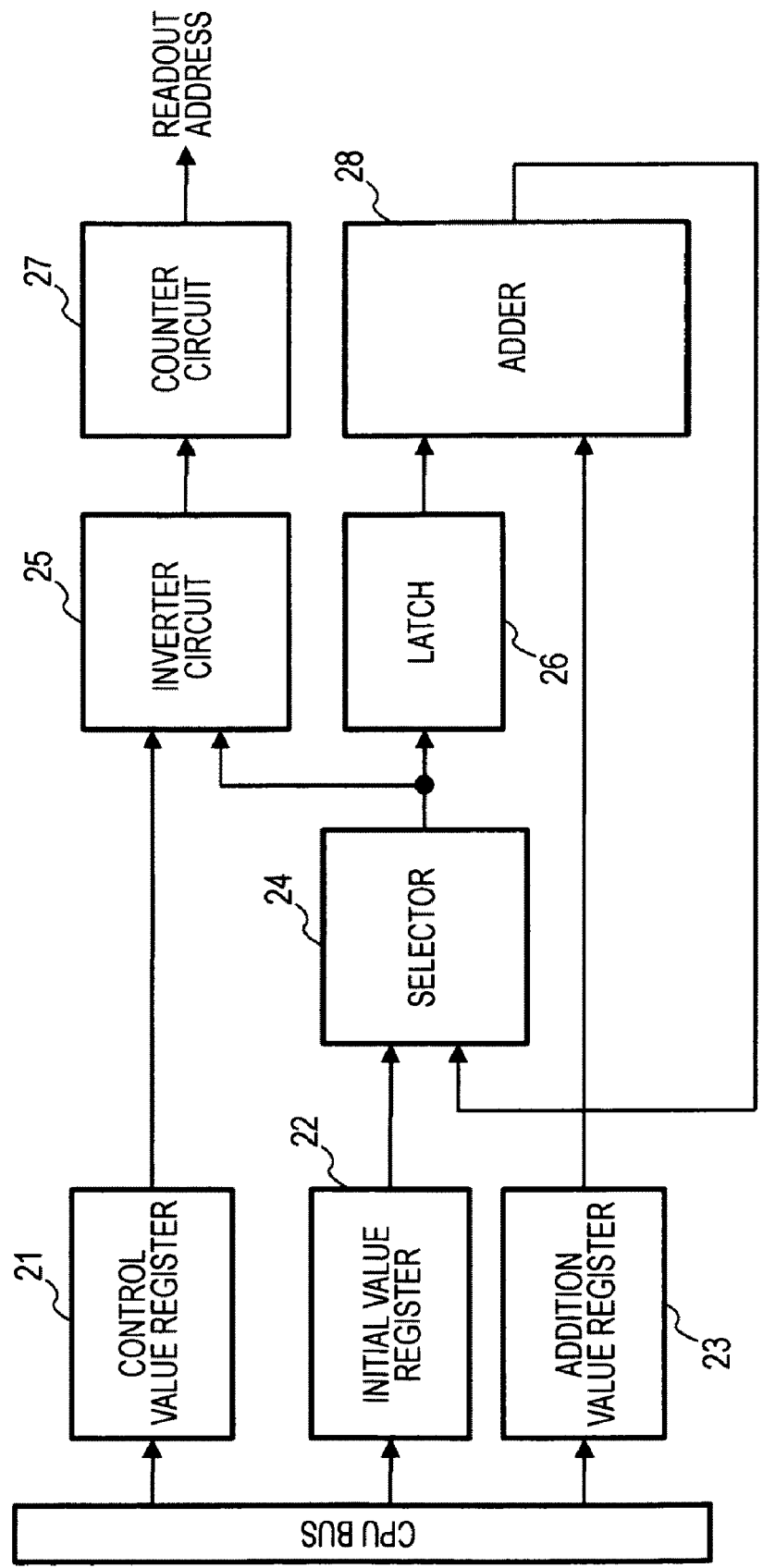
FIG. 3 is a block diagram showing in detail an example of the configuration of an OSD enlargement address generating circuit that generates an address at which the double reading of a pixel is performed in enlargement of the OSD layer.

FIG. 3 is a block diagram showing in detail an example of the configuration of an OSD enlargement address generating circuit that generates an address at which the double reading of a pixel is performed in the enlargement of the OSD layer. Although an exemplary operation of horizontal enlargement will be described, the same circuit can be used to realize vertical enlargement.

Referring to FIG. 3, the OSD enlargement address generating circuit includes a control value register 21, an initial value register 22, an addition value register 23, a selector 24, an inverter circuit 25, a latch 26, a counter circuit 27, and an adder 28. A control value, an initial value, and an addition value are written in the control value register 21, the initial value register 22, and the addition value register 23, respectively, by the CPU. The initial value stored in the initial value register 22 includes an integer part and a decimal part. The addition value stored in the addition value register 23 is set to a real number not larger than one. The selector 24 receives two inputs from the initial value register 22 and the adder 28. The selector 24 selectively outputs either of the two inputs and the output value is stored in the latch 26. The adder 28 adds the value stored in the latch 26 to the addition value stored in the addition value register 23.

At start of the enlargement process of the OSD layer, the selector 24 is switched to the output from the initial value register 22. At the beginning of a line, the initial value stored in the initial value register 22 is loaded by the selector 24 and is stored in the latch 26.

Then, the selector 24 is switched to the output from the adder 28. Subsequently, in the effective image area, the addition values stored in the addition value register 23 are sequentially added by the adder 28 every clock. The addition result in the adder 28 is output from the selector 24 and only the decimal part of the addition result is stored in the latch 26. The decimal part of the addition result is accumulated every clock by the above process.

Only the carry of the integer part of the addition result output from the selector 24 is detected and the detection result is input in the inverter circuit 25. Whether the counter circuit 27 is stopped if the carry of the addition result occurs in accordance with the control value stored in the control value register 21 or the counter circuit 27 counts up the readout address only if the carry of the addition result occurs in accordance with the control value stored in the control value register 21 is selected depending on the on or off setting of carry bit inversion in the inverter circuit 25 (when the carry bit inversion in the inverter circuit 25 is turned on, the readout of the same pixel is repeated if no carry occurs and the counter circuit 27 counts up the readout address if the carry occurs). The output from the counter circuit 27 is used as a readout address at which the OSD layer is read out from the large scale RAM 11.

For example, in the example shown in FIG. 11 in which the readout address is normally counted up for every pixel and only a certain pixel is read out twice, the counter circuit 27 is stopped if the carry occurs. In the example shown in FIG. 13 in which the same pixel is normally continuously read out several times, the counter circuit 27 counts up the readout address only if the carry occurs. In other words, the control value corresponding to the determination result of whether the enlargement process of the OSD layer in FIG. 11 or that in FIG. 13 is selected is written in the control value register 21.

For example, when the decimal part is set to 15 bits in the initial value register 22, the integer part between zero and one is divided into areas of gray scales of two raised to the fifteenth power (32,768). Specifically, if the addition of the addition value to the cumulative value results in a number exceeding "8,000" (hexadecimal number), the carry of the integer part occurs and the most significant bit represents the integer part. As a result, the 15-bit decimal part not larger than the above value is used as the cumulative value in the subsequent addition. Numerically, the carry occurs if the addition result exceeds "8,000" (hexadecimal number) and "8,000" (hexadecimal number) is used as the integer part when the carry operation is started. Accordingly, the result given by subtracting "8,000" (hexadecimal number) from the addition result in the adder 28 is stored in the latch 26 and is used in the subsequent accumulation.

When the enlargement process of the OSD layer is performed in the pattern in which the readout address is normally counted up for every pixel and a certain pixel is read out twice, as in the example in FIG. 11, the number of repetitive cycles after the conversion is denoted by "A" (the following pixels are sequentially read out in a range from the first pixel to an A-1-th pixel and the A-1-th pixel is repeated as an A-th pixel) and the digit number of the addition value is denoted by "IN". In this case, the integer part between zero and one is divided into resolutions of two raised to an N-th power. The addition value stored in the addition value register 23 should be set so that the addition value becomes equal to one on the A-th addition. Accordingly, the addition value is represented by Equation (1):

$$\text{Addition value} = (\text{two raised to the } N\text{-th power})/A \quad (1)$$

When the enlargement process of the OSD layer is performed in the pattern in which the readout of the same pixel is normally repeated several times and the next pixel is read out only if the carry of the integer part occurs, as in the example in FIG. 13, "C" pixels in the original image are converted into "D" pixels (the "C" is set to four and the "D" is set to nine because the conversion from four pixels to nine pixels is repeated in the conversion from 640 pixels into 1,440 pixels). Since it is basically sufficient for the carry to occur in the "D" pixels, the addition value is calculated by (two raised to the N-th power)/C, in which the carry in the original four pixels should occur in the nine-pixel cycle. Accordingly, the actual addition value is represented by Equation (2):

$$\text{Addition value} = (\text{two raised to the } N\text{-th power}) \times C/D \quad (2)$$

The same operation is performed also in the vertical enlargement process of the OSD layer. Specifically, the vertical enlargement process is performed by loading the initial value at the beginning of a field, adding the addition value for every line, and repetitively displaying the line in which the carry of the integer part occurs.

As described above, the OSD enlargement address generating circuit in FIG. 3 uses the three parameters: the initial value, the addition value, and the determination result of whether the carry result is inverted as the settings and the parameters are written in the initial value register 22, the addition value register 23, and the control value register 21, respectively, via a CPU bus. As apparent from the above Equations, the addition value represents the scaling factor and the initial value represents the position of the repeated pixel. Accordingly, it is sufficient to vary the addition value in order to vary the scaling factor in part of one horizontal line or one vertical field. Consequently, with an OSD partial enlargement circuit shown in FIG. 4, it is possible to realize an OSD partial enlargement process causing the intermittent double reading of an image not to be performed in the area where character or graphic data is displayed.

The OSD enlargement address generating circuit in FIG. 3 includes the registers for the above settings from the control value register 21 to the addition value register 23, the selector 24, the latch 26, the adder 28, the inverter circuit 25 for the carry result, and the counter circuit 27 for the generation of the readout address. In contrast, the OSD partial enlargement circuit in FIG. 4 includes address registers 31A and 31B, an address generating circuit 32, an address decoder 33, and an addition value selector 34, in addition to the components in FIG. 3, to realize the partial enlargement of the OSD layer. Since the address generating circuit 32 is often used in each process, data in any address generating circuit that is built in the OSD partial enlargement circuit can be supplied to realize the address generating circuit 32. The added circuit components in FIG. 4 have a very small number of gates. Specifically, the OSD partial enlargement circuit can simply switch the scaling factor by using the read circuit twice, that is, in the carry of the initial value and in the carry of the addition value to switch the addition value. Accordingly, it is possible to realize the OSD partial enlargement circuit only by adding a small number of gates to the OSD-layer enlargement circuit despite of the complicated process of varying the scaling factor in part of the image.

A method of setting the addition value will now be described. First, the original image on the OSD layer is divided into areas where data to be actually displayed (character information and graphic information) is present and areas where no display data is present. It is possible to calculate the scaling factor of the areas where no display information is present when the areas where the display data is present are displayed at a scaling factor of 1× magnification. The addition value in the areas where no display value is present is calculated according to Equation (1) or (2) on the basis of the calculated value.

Figure 4:
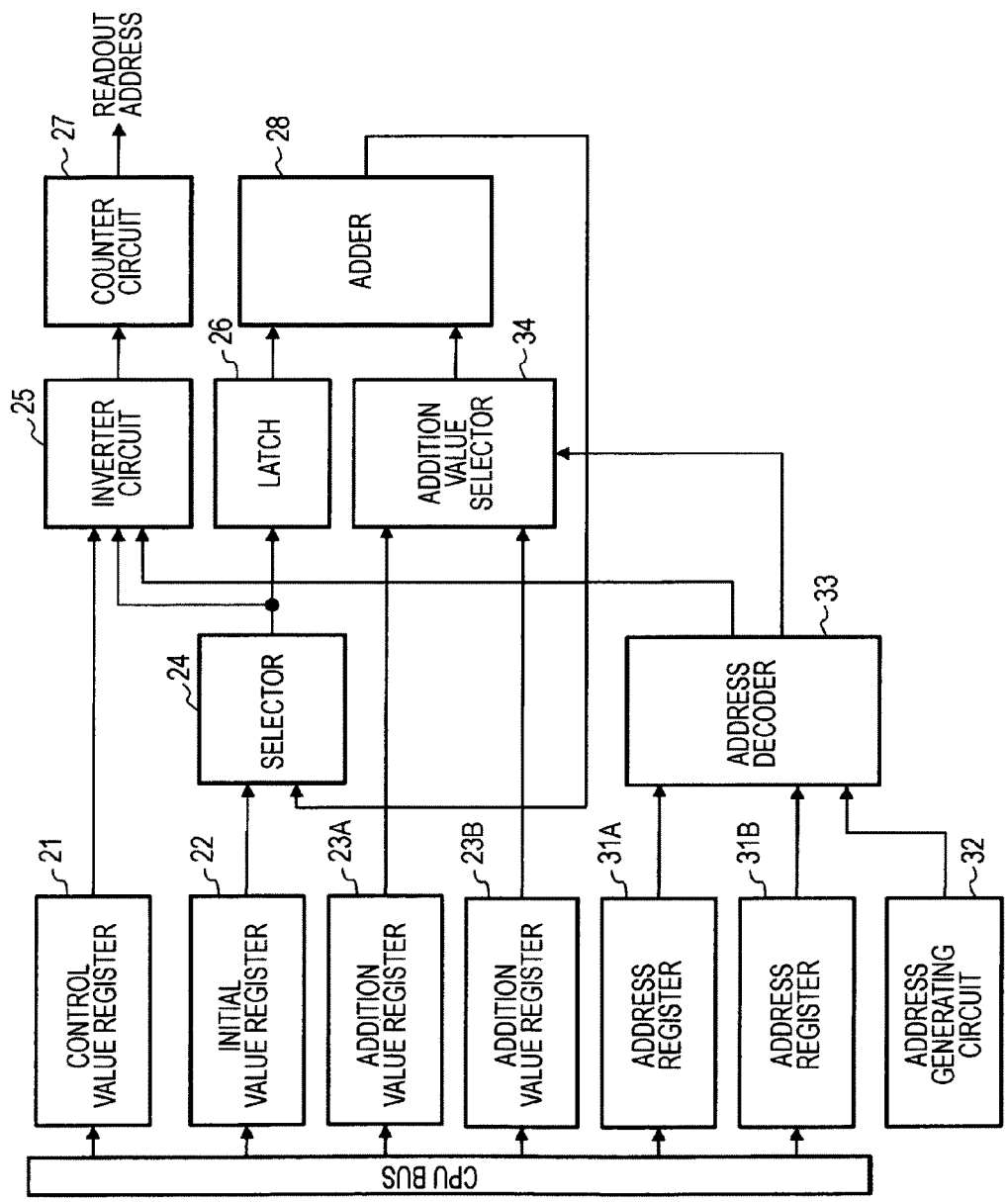
FIG. 4 is a block diagram showing an example of the configuration of an OSD partial enlargement circuit.

Since the horizontal operation is similar to the vertical operation in the setting of the addition value, the horizontal operation of the OSD partial enlargement circuit shown in FIG. 4 will now be described.

The number of pixels from the horizontal left end (the horizontal counter has a value of zero) to the position where display information is present is set in the address register 31A, and the address where right display information is started is set in the address register 31B.

The address decoder 33 determines the horizontal address from the address generating circuit 32 on the basis of the settings in the address registers 31A and 31B. The addition value selector 34 selects an addition value 2 if the horizontal address is between the value set in the address register 31A and the value set in the address register 31B and otherwise selects an addition value 1 on the basis of the determination result in the address decoder 33.

After the horizontal readout of image data is started, the adder 28 accumulates the addition values for every pixel by using an appropriate initial value set in the initial value register 22 as the start point.

The scaling factor is equal to 1× magnification in the areas where the display information, such as the character or graphic data, is present on the OSD layer. Accordingly, the value in an addition value register 23A is loaded in the addition value selector 34 to set the addition value to a real number "1.0" and the carry bit inversion in the inverter circuit 25 is turned on. Although the carry occurs every time with the above settings, the counter circuit 27 for the address generation constantly counts up the readout address by one because the inverter circuit 25 is turned on (when the carry bit inversion in the inverter circuit 25 is turned on, the readout of the same pixel is repeated if no carry occurs and the counter circuit 27 counts up the readout address if the carry occurs).

In the areas where no display information is present on the OSD layer, the addition value selector 34 is switched on the basis of the determination result of the horizontal address in the address decoder 33 and an addition value that corresponds to the specified scaling factor and that is equal to a number lower than one is loaded from an addition value register 23B to the addition value selector 34. Concurrently, the carry bit inversion in the inverter circuit 25 is turned off. The adder 28 subsequently adds the addition values from the addition value register 23B to the cumulative value. The double reading of a pixel is performed if the carry of the integer part of the cumulative value occurs to perform the enlargement from the original image size to the enlarged image size.

When the horizontal address reaches the area on the right side where the display information is present, the addition value selector 34 is switched again and the addition value "1.0" set in the addition value register 23A is loaded in the addition value selector 34 again. Concurrently, the carry bit inversion in the inverter circuit 25 is turned on to output the original image at the scaling factor of 1× magnification.

As described above, the area where the display information, such as the character or graphic data, is not present on the OSD layer is enlarged at a scaling factor of a real number from an arbitrary specified number of pixels to another arbitrary specified number of pixels. Substitution into Equation (1) or (2) allows any conversion from an arbitrary number of pixels to another arbitrary number of pixels to be performed, so that the size of the area where the display information is present on the OSD layer is not restricted. Accordingly, it is possible to flexibly accommodate the amount of the display information by increasing the size of the central enlargement area (the area that is enlarged at a scaling factor of a real number) if a small amount of the display information is present on the OSD layer and decreasing the size of the central enlargement area (the area that is enlarged at a scaling factor of a real number) if a large amount of the display information is present on the OSD layer. The area where the display information is present and the area where no display information is present may be fixed regardless of the amount of the display information and the character or graphic information may be included in the area where the display information is present.

Exemplary actual operations for the partial enlargement of the OSD layer will now be described by using specific numerical values.

Figure 5:
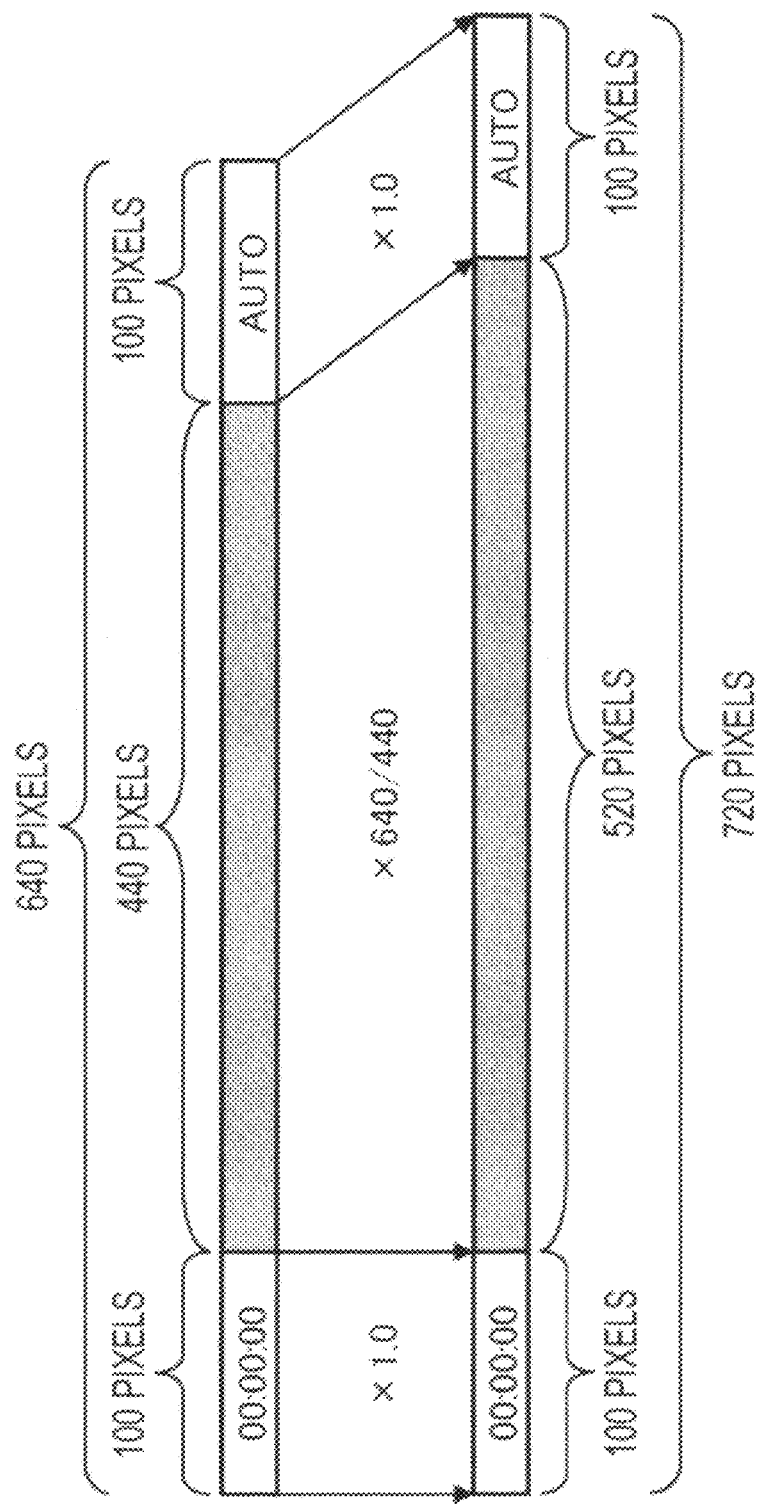
FIG. 5 illustrates a partial enlargement process to enlarge horizontal 640 pixels on the OSD layer to 720 pixels.

First, a case where horizontal 640 pixels on the OSD layer are enlarged to horizontal 720 pixels will be described. Provided that the display information, such as the character or graphic data, is present in 100 pixels on the left side and in 100 pixels on the right side, the left 100 pixels and the right 100 pixels among the 720 pixels are to be displayed on the OSD layer at a scaling factor of 1× magnification. Accordingly, as shown in FIG. 5, the central area is enlarged at a scaling factor of a real number from 440 pixels (=640−100−100) to 520 pixels (=720−100−100). This enlargement can be replaced with repetition of the enlargement process from 11 pixels to 13 pixels. If the decimal part of the initial value set in the initial value register 22 is set to 15 bits, the addition value can be calculated according to Equation (2) in the following manner:

$$\text{Addition value} = (\text{two raised to the fifteenth power}) \times 11/13 = 27{,}727$$

The above value is equal to a hexadecimal number "6C4F". Since the pattern in which the "C" pixels are converted into the "D" pixels is adopted, it is sufficient to invert the carry value and to perform the double reading of an pixel only if no carry occurs. Accordingly, the following parameters can be set in each register in the OSD partial enlargement circuit in FIG. 4 to realize the desired partial enlargement process. The initial value is set to "8,000" (hexadecimal number) in this case.

Addition value 1: 8,000 (hexadecimal number)
    Addition value 2; 6C4F (hexadecimal number)
    Address A: 100 (decimal number)
    Address B: 620 (decimal number)
    Inverter circuit: constantly inverted In the first (left-side) 100 pixels, the adder 28 adds the addition value 1 (8,000) each time. Since the sixteenth bit is the integer part, the carry of the integer part occurs each time and the address is updated each time, thus performing the enlargement process at a scaling factor of ×1 magnification. Since the decimal part is constantly equal to zero, the cumulative value is constantly equal to zero.

Figure 6:
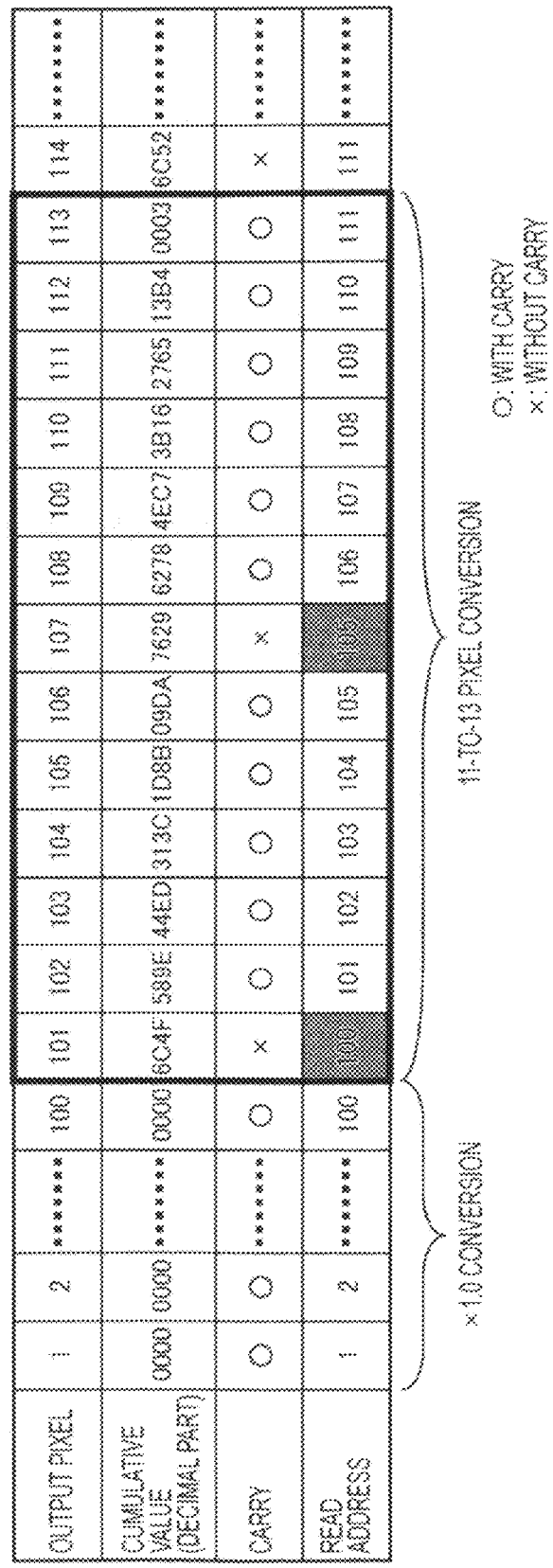
FIG. 6 illustrates the partial enlargement process to enlarge horizontal 640 pixels on the OSD layer to 720 pixels.

In the 101-th pixel and the subsequent pixels, the addition value is switched in the selector 24 and the adder 28 adds the addition value 2 (6C4F). Since the carry of the integer part does not occur at the 101-th pixel, the counter circuit 27 for generating the readout address does not count up the readout address and the readout of the previous pixel is repeated. At the next 102-th pixel, the adder 28 adds the addition value 2 (6C4F) to the cumulative value (6C4F) in the decimal part and the addition value becomes equal to "D89E" (hexadecimal number). Since the carry of the integer part occurs in this case, the readout address is counted up. Since "8,000" (hexadecimal number) in the addition value is the integer part, the decimal part is equal to a value (589E) resulting from subtraction of "8,000" (hexadecimal number). Similar calculation is subsequently executed to perform the partial enlargement from 640 pixels to 720 pixels in a manner shown in FIG. 6.

Figure 7:
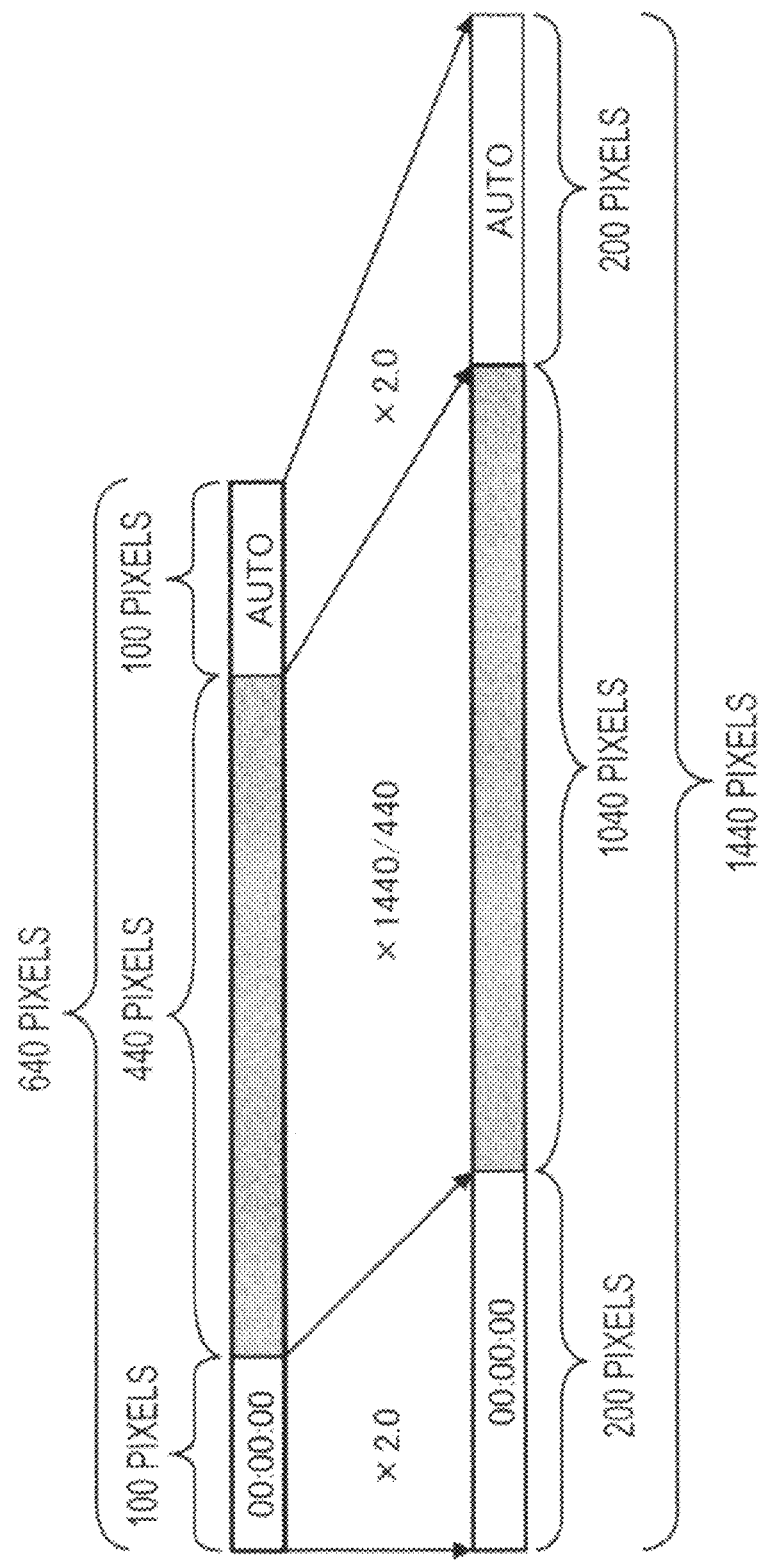
FIG. 7 illustrates a partial enlargement process to enlarge horizontal 640 pixels to D terminal output in a D3 format (horizontal 1,440 pixels)

Next, a case where horizontal 640 pixels on the OSD layer are enlarged to the D terminal output in the D3 format (the number of horizontal pixels is equal to "1,440") will be described as another example of the partial enlargement of the OSD layer. The scaling factor of the OSD layer is very large in this case. The display of the display information, such as the character or graphic data, on the OSD layer at a scaling factor of ×1 magnification results in the display information that is to small for the output screen. Accordingly, if the scaling factor is set to a higher value, the scaling factor of the area where the display information is present is fixed to an integer (that is, each pixel is repetitively read out the same number of times) while the area where no display information is present is enlarged at a scaling factor of a real number. FIG. 7 illustrates an example in which the area where the display information is present is enlarged at a scaling factor of "2.0". When characters or graphics are enlarged, the enlargement at a scaling factor of an integer causes the read out of all the pixels to be repeated the same number of times, thus outputting a relatively clear character or graphic image without any irregular jaggy on an oblique line. In other words, the partial enlargement process can be performed to suppress the degradation of the image quality of the character or graphic data on the OSD layer and to keep the design of the character or graphic data.

Also provided that the display information, such as the character or graphic data, is present in 100 pixels on the left side of the original image and in 100 pixels on the right side thereof, the left 100 pixels and the right 100 pixels are enlarged at a scaling factor of "2.0" and the remaining central area is subjected to the conversion from 440 pixels to 1,040 pixels (1,440−200×2). This enlargement can be replaced with repetition of the enlargement process from 11 pixels to 26 pixels. If the decimal part of the initial value set in the initial value register 22 is set to 15 bits, the addition value can be calculated according to Equation (2) in the following manner:

$$\text{Addition value} = (\text{two raised to the fifteenth power}) \times 11/26 = 13{,}863$$

The above value is equal to a hexadecimal number "3627". Accordingly, the following parameters can be set in each register in the OSD partial enlargement circuit in FIG. 4 to realize the desired partial enlargement process. The initial value is set to "4,000" (hexadecimal number) in this case.

Addition value 1: 4,000 (hexadecimal number)
    Addition value 2; 3627(hexadecimal number)
    Address A: 200 (decimal number)
    Address B: 1,240 (decimal number)
    Inverter circuit: constantly inverted In the first 200 pixels, the adder 28 adds "4,000" (hexadecimal number). Accordingly, the horizontal address reaches "8,000" (hexadecimal number) every two times and the carry of the integer part of the cumulative value occurs. When the cumulative value reaches "8,000" (hexadecimal number), the integer part "8,000" (hexadecimal number) is discarded and the cumulative values returns to "0000". The same pixel as the previous pixel is repetitively displayed if no carry occurs and the counter circuit 27 counts up the readout address by one if the carry occurs, thus performing the enlargement at a scaling factor of "2.0" in this area.

In the 200-th pixel and the subsequent pixels, the adder 28 adds the addition value "3627" (hexadecimal). The same pixel is repetitively read out if the carry of the integer part of the cumulative value does not occur, and the next pixel is read out if the carry of the integer part of the cumulative value occurs. This corresponds to the conversion of 11 pixels into 26 pixels and the repetition of this process enlarges 440 pixels into 1,040 pixels in a manner shown in FIG. 8.

In the pixels subsequent to the 1240-th pixel, the addition value is switched to "4,000" (hexadecimal) again and the same pixel is repeated every two pixels to perform the enlargement at a scaling factor of "2.0".

If the difference in the scaling factor between the output image and the display information is too large with respect to the original image, the display information, such as the character or graphic data, can be undesirably too large or too small for the screen of the display. Such a problem can be resolved to some extent by enlarging the display information at a scaling factor close to the scaling factor of the graphics.

For example, in a case where the NTSC (horizontal 720 pixels) is selected in the line output on the OSD layer having horizontal 640 pixels, the scaling factor is equal to "1.125" if the OSD layer is uniformly enlarged. In contrast, with the above partial enlargement method, the display information, such as the character or graphic data, is enlarged at a scaling factor of "1.0" as shown in FIG. 5. In this case, since the difference in the scaling factor is not so large, the display information, such as the character or graphic data, does not become too large or too small for the screen.

In a case where images are output by the D terminal output in the D3 format, the number of horizontal pixels is equal to "1,440" and the uniform enlargement of the OSD layer results in a scaling factor of "2.25". In contrast, with the above partial enlargement method, the display information, such as the character or graphic data, is enlarged at a scaling factor of "2.0" as shown in FIG. 7. In this case, since the difference in the scaling factor is not so large, it is possible to prevent the display information, such as the character or graphic data, from becoming too large or too small for the screen.

The display information on the OSD layer includes the title displayed when the apparatus is turned on, information indicating shortage of the remaining amount of battery, information indicating shortage of the remaining amount of tape (or shortage of the free space of a recording medium), which are displayed in the central area of the screen, in addition to the variety of information during image capturing or playback. When the characters or graphics are displayed in the central area of the screen, similar effects can be achieved by reversing the scaling factors of the respective areas, that is, by enlarging the area where the central display information is present at a scaling factor of an integer and enlarging the areas where no display information is present at the top, bottom, left, and right ends at a scaling factor of a real number.

Figure 9:
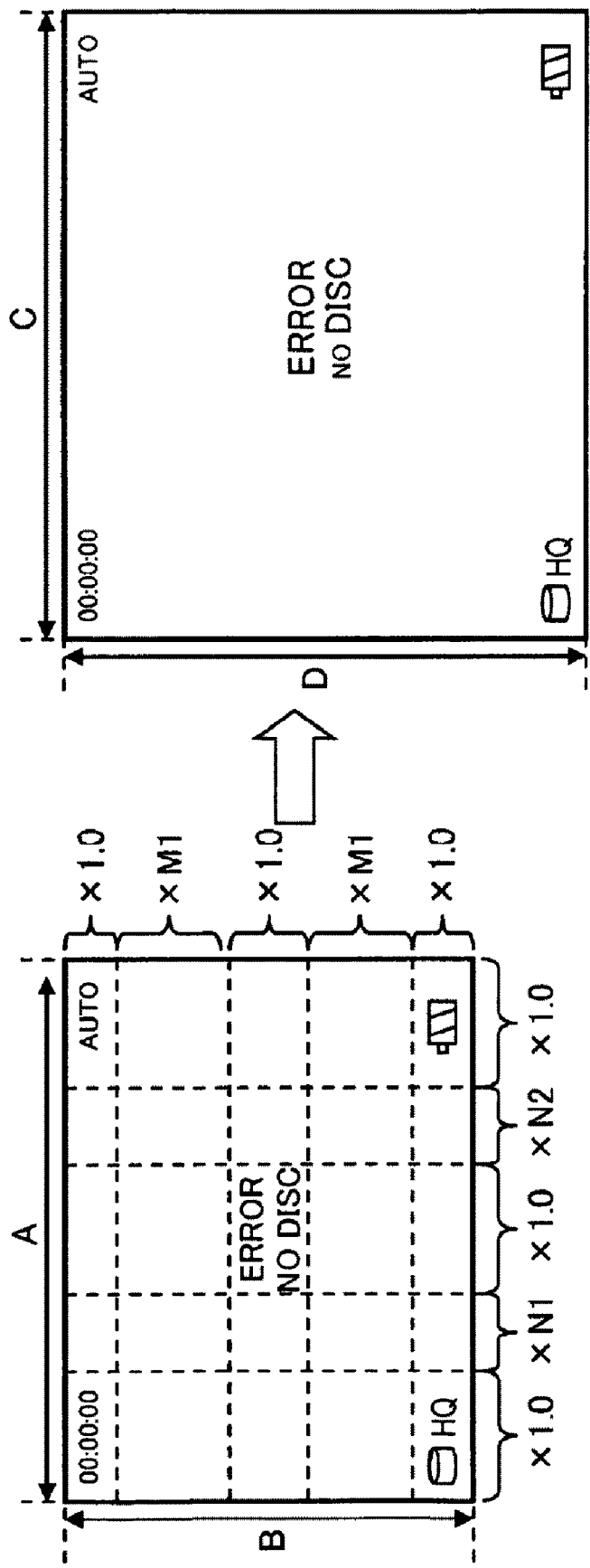
FIG. 9 illustrates a case where the OSD layer is divided into multiple areas and the scaling factor of each area is determined on the basis of whether the display information is present.

In some cases, the variety of information during image capturing or playback may be displayed at the top, bottom, left, and right ends of the screen and a warning message may be concurrently displayed in the central area. Also in these cases, the OSD layer is divided into the areas where the display information is present and the areas where no display information is present and the scaling factor is varied for every area. FIG. 9 illustrates a case where the OSD layer is divided into multiple areas and the scaling factor of each area is determined on the basis of whether the display information is present. Such a case can be supported by only adding a decoding circuit detecting each divided area, addition value registers corresponding to the scaling factors of the divided areas, addition value setting registers, and the input terminals of the selector of a number corresponding to the number of the addition value setting registers to the OSD partial enlargement circuit shown in FIG. 4.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus displaying an image on a display screen having a predetermined image size, the image processing apparatus comprising:

a first memory area storing image information on a main image layer;

a second memory area storing image information on an on-screen display layer that includes display information including character information or graphic data and that has a predetermined reference size;

image scaling means for scaling the image information on the main image layer in the first memory area in accordance with the image size of the display screen;

on-screen display enlarging means for reading out the image information on the on-screen display layer from the second memory area and enlarging the readout image information so as to be fitted in the image size of the display screen; and mixing means for mixing the enlarged image information on the on-screen display layer with the enlarged or reduced image information on the main image layer, wherein the on-screen display enlarging means includes first on-screen display partial enlargement means for enlarging the image information in an area where the display information is not present on the on-screen display layer and second on-screen display partial enlargement means for enlarging the image information in an area where the display information is present on the on-screen display layer by a method different from that of the first on-screen display partial enlargement means, wherein the first on-screen display partial enlargement means enlarges the area where the display information is not present on the on-screen display layer at a scaling factor of a real number, wherein the second on-screen display partial enlargement means enlarges the area where the display information is present on the on-screen display layer at a scaling factor "N" ("N" is an integer not smaller than one), and wherein the first on-screen display partial enlargement means reads out the same pixel twice on a predetermined cycle while normally reading out pixels one by one or the first on-screen display partial enlargement means increases the number of times of readout of the same pixel on a predetermined cycle while normally continuously reading out the same pixel a predetermined number of times, in order to enlarge the area where the display information is not present on the on-screen display layer at a scaling factor of a real number.

2. The image processing apparatus according to claim 1, wherein the second on-screen display partial enlargement means does not perform the enlargement in the area where the display information is present on the on-screen display layer.

3. The image processing apparatus according to claim 1, wherein the second on-screen display partial enlargement means continuously reads out the same pixel a predetermined number of times in the area where the display information is present on the on-screen display layer to perform the enlargement at scaling factor of an integer.

4. The image processing apparatus according to claim 1, wherein the second on-screen display partial enlargement means does not enlarge the area where the display information is present on the on-screen display layer if the scaling factor is not higher than a predetermined value and enlarges the area where the display information is present on the on-screen display layer at a scaling factor of an integer if the scaling factor exceeds the predetermined value.

5. An image processing method for mixing image information on a main image layer with image information on an on-screen display layer that includes display information including character information or graphic data and displaying the mixed image on a display screen having a predetermined image size, the image processing method comprising the steps of:

scaling the image information on the main image layer in accordance with the image size of the display screen;

enlarging the image information on the on-screen display layer having a predetermined reference size so as to be fitted in the image size of the display screen; and mixing the enlarged image information on the on-screen display layer with the enlarged or reduced image information on the main image layer, wherein the enlarging includes a first on-screen display partial enlargement step for enlarging the image information in an area where the display information is not present on the on-screen display layer and a second on-screen display partial enlargement step for enlarging the image information in an area where the display information is present on the on-screen display layer by a method different from that of the first on-screen display partial enlargement step, wherein the first on-screen display partial enlargement step enlarges the area where the display information is not present on the on-screen display layer at a scaling factor of a real number, wherein the second on-screen display partial enlargement step enlarges the area where the display information is present on the on-screen display layer at a scaling factor "N" ("N" is an integer not smaller than one), and wherein the first on-screen display partial enlargement step reads out the same pixel twice on a predetermined cycle while normally reading out pixels one by one or the first on-screen display partial enlargement step increases the number of times of readout of the same pixel on a predetermined cycle while normally continuously reading out the same pixel a predetermined number of times, in order to enlarge the area where the display information is not present on the on-screen display layer at a scaling factor of a real number.

6. The image processing method according to claim 5, wherein the second on-screen display partial enlargement step does not perform the enlargement in the area where the display information is present on the on-screen display layer.

7. The image processing method according to claim 5, wherein the second on-screen display partial enlargement step continuously reads out the same pixel a predetermined number of times in the area where the display information is present on the on-screen display layer to perform the enlargement at scaling factor of an integer.

8. The image processing method according to claim 5, wherein the second on-screen display partial enlargement step does not enlarge the area where the display information is present on the on-screen display layer if the scaling factor is not higher than a predetermined value and enlarges the area where the display information is present on the on-screen display layer at a scaling factor of an integer if the scaling factor exceeds the predetermined value.

* * * * *